(No Model.)
W. T. VAN DORN.
TOASTING PAN.
No. 386,170. Patented July 17, 1888.
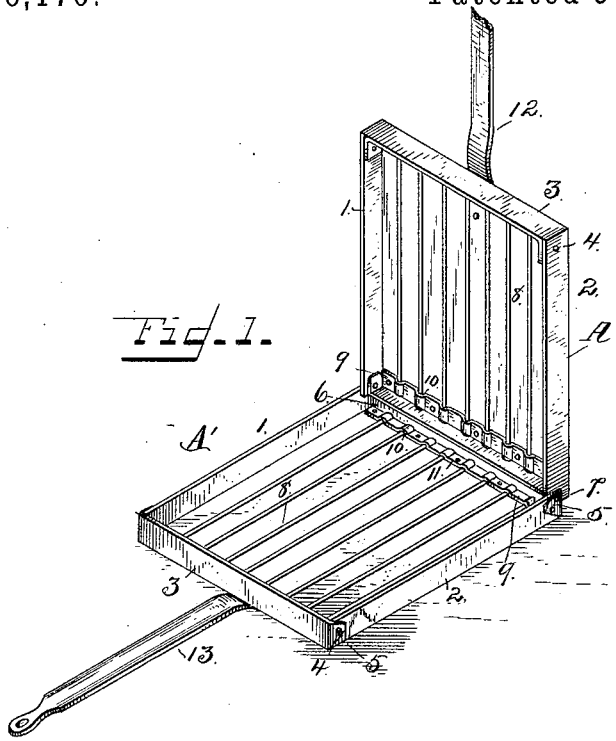
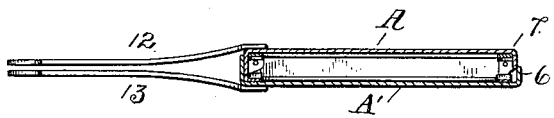
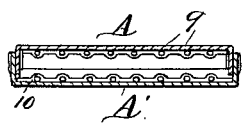
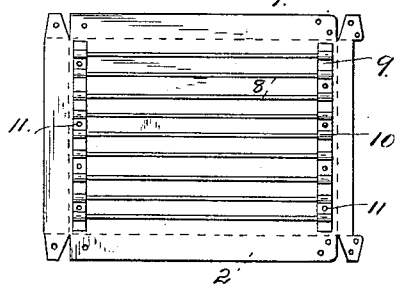
Witnesses,
J. Thomson Cross
A. G. Heylmun
Inventor,
Wm. T. Van Dorn.
By his Attorneys
Hamilton & Truvitt

UNITED STATES PATENT OFFICE.

WILLIAM T. VAN DORN, OF LINCOLN, NEBRASKA.

TOASTING-PAN.

SPECIFICATION forming part of Letters Patent No. 386,170, dated July 17, 1888.

Application filed January 14, 1888. Serial No. 260,757. (No model.)

*To all whom it may concern:*

Be it known that I, WILLIAM T. VAN DORN, a citizen of the United States of America, residing at Lincoln, in the county of Lancaster and State of Nebraska, have invented a new and useful Toasting-Pan, of which the following is a specification.

My invention has relation to improvements in culinary implements designed for toasting bread and similar articles; and the object is to provide an improved article or implement which is cheaply constructed, and durable and efficient in the uses to which it is applicable.

My invention consists in the novel construction of parts and their combinations as an entirety, as will be fully described hereinafter, and specially, as the same is pointed out in the claim made thereto.

I have fully illustrated my improvements in the accompanying drawings, wherein Figure 1 is a perspective of the toaster opened to receive the bread. Fig. 2 is a longitudinal sectional view. Fig. 3 is a transverse sectional view; and Fig. 4 is a plan view of one of the pans, showing the manner of securing the rods or wires in place, and the sides and ends being shown in extension.

Reference being had to the drawings, wherein the same notations designate like elements or parts, A and A' designate the two pans or parts comprising the toaster. These are composed of sheet metal, the finer qualities of which are preferred, in order that the utensil may have a sightly appearance, and because these are less damaged by the heat than the coarser or unfinished grades. The struck-up parts 1 2 and hand ends 3 of the pans are of equal width and may be secured together by means of a rivet, 4, through a lap, 5, struck down on the sides, as shown. The end flange, 6, at the hinged end of the pan is made of less height than the other sides of the pans, in order that when the utensil is opened, as seen in Fig. 1 of the drawings, the edge of the end piece of the lower pan shall serve as a rest for the upper pan and support it in the position substantially as shown.

The pans are made to set with the flanges or struck-up sides of the one within the other when closed, and are pivotally connected together at the side ends, as at 7, by setting a pivot-rivet through the parts at this point, the pivotal point being a short distance inwardly from the corner, as best shown in Figs. 1 and 2 of the drawings.

In the bottom of each pan are arranged a number of wires or rods, 8, arranged at about equal distance and close on the surface of the pans. These wires are in length equal to the length of the pans, and may be laid within lengthwise, as shown, or crosswise, as preferred, and they are secured in position by means of sheet-metal strips 9, formed with transverse grooves or beads 10, to set over the wires. The strips 9 are fastened to the pans by means of rivets 11. It will thus be seen that by the arrangement of the wires or rods in the grooves of the fastening-strips the casings or pans and the rods will be independently affected by the heat, so that the contraction or expansion of the one will not bend the other and otherwise affect the shape of the utensil, but either can resume its original position when cooled.

To each pan is attached a handle, 12 13, by which the utensil is opened and closed and handled.

My improved toaster is not intended for use as a gridiron, but especially for toasting bread, and for this purpose it is utilized by laying the piece of bread on one of the pans and then closing the utensil and subjecting it to sufficient heat to brown the contents.

What I claim is—

The toasting utensil herein described, consisting of the sheet-metal pans A A', pivoted together at the side ends and formed to close with their edges one within the other, and having the flanges at their hinged end lower than the other sides, to form supports when the utensil is opened, and provided with the wire rods 8, held in the bottom of the pans by grooved strips laid over the ends of the wires and riveted to the pans, substantially as described.

In witness whereof I have hereunto set my hand in the presence of two attesting witnesses.

WILLIAM T. VAN DORN.

Attest:
W. E. JOHNSON,
THOMAS DUVALL.